US008562712B2

(12) United States Patent
Haidar

(10) Patent No.: US 8,562,712 B2
(45) Date of Patent: Oct. 22, 2013

(54) METHOD AND APPARATUS FOR THE PRODUCTION OF METAL COMPOUNDS

(75) Inventor: Jawad Haidar, Carlton (AU)

(73) Assignee: Commonwealth Sci. and Ind. Res. Org., (B) Campbell (AU)

( * ) Notice: Subject to any disclaimer, the term of this patent is extended or adjusted under 35 U.S.C. 154(b) by 598 days.

(21) Appl. No.: 10/560,804

(22) PCT Filed: Jul. 5, 2004

(86) PCT No.: PCT/AU2004/000899
§ 371 (c)(1),
(2), (4) Date: Dec. 15, 2005

(87) PCT Pub. No.: WO2005/002766
PCT Pub. Date: Jan. 13, 2005

(65) Prior Publication Data
US 2006/0191372 A1      Aug. 31, 2006

(30) Foreign Application Priority Data

Jul. 4, 2003 (AU) ................................. 2003903426
Nov. 21, 2003 (AU) ................................. 2003906420

(51) Int. Cl.
*C21B 11/10* (2006.01)
*C21B 13/12* (2006.01)
*C21C 5/52* (2006.01)
*C21C 5/54* (2006.01)
*C22B 4/00* (2006.01)

(52) U.S. Cl.
USPC ............................................. 75/10.21; 75/620

(58) Field of Classification Search
USPC .................. 75/416, 369, 10.21, 620
See application file for complete search history.

(56) References Cited

U.S. PATENT DOCUMENTS

| 2,745,735 A | 5/1956 | Byrns |
| 3,004,848 A | 1/1961 | Hansley et al. |
| 3,252,823 A | 5/1966 | Jacobson et al. |

(Continued)

FOREIGN PATENT DOCUMENTS

| DE | 27 47 016 | 4/1978 |
| DE | 2747016 | 4/1978 |

(Continued)

OTHER PUBLICATIONS

Murphy et al. ("Equilibrium Calculation of the Reduction of Titanium Tetrachloride by Aluminum and Hydrogen" High Temp. Chem. Processes Aug. 3, 1994, pp. 365-374).*

(Continued)

*Primary Examiner* — Weiping Zhu
(74) *Attorney, Agent, or Firm* — Neifeld IP Law, PC

(57) ABSTRACT

The present invention relates to a method and apparatus for the production of titanium alloys and titanium-aluminum inter-metallic compounds and alloys. Starting from a precursor material including titanium subchloride (titanium trichloride or titanium dichloride), the precursor material is reduced by aluminum to produce titanium-aluminum intermetallic complexes or alloys and aluminum chloride which is driven away from the reaction zone so as to favor the forward reaction and the production of the titanium-aluminum compounds. Starting from a precursor material of titanium subchloride avoids the problems associated with starting from titanium metal (which is expensive to produce) or titanium tetrachloride (a reaction very difficult to control), and results in the production of powdered forms of titanium-aluminum compounds with controllable composition.

27 Claims, 8 Drawing Sheets

(56) References Cited

U.S. PATENT DOCUMENTS

| | | | |
|---|---|---|---|
| 3,301,665 | A | 1/1967 | Timm et al. |
| 3,450,525 | A | 6/1969 | Van Den Steen |
| 3,455,678 | A | 7/1969 | Shapiro et al. |
| 3,684,264 | A | 8/1972 | Petrov et al. |
| 3,900,312 | A | 8/1975 | Terry et al. |
| 4,437,888 | A | 3/1984 | Jecker |
| 4,447,045 | A | 5/1984 | Kimura et al. |
| 4,508,322 | A | 4/1985 | Kimura et al. |
| 4,877,445 | A | 10/1989 | Okudaira et al. |
| 4,902,341 | A | 2/1990 | Okudaira et al. |
| 5,032,176 | A | 7/1991 | Kametani et al. |
| 5,397,375 | A * | 3/1995 | O'Donnell et al. ............. 75/368 |
| 5,460,642 | A | 10/1995 | Leland |
| 5,935,293 | A | 8/1999 | Detering et al. |
| 2002/0184971 | A1 | 12/2002 | Myrick |
| 2004/0050208 | A1 * | 3/2004 | Nie et al. ......................... 75/369 |
| 2006/0191372 | A1 | 8/2006 | Haidar |
| 2009/0165597 | A1 | 7/2009 | Haidar et al. |
| 2011/0091350 | A1 | 4/2011 | Haidar |

FOREIGN PATENT DOCUMENTS

| | | |
|---|---|---|
| EP | 0 097 135 | 12/1983 |
| EP | 0097135 | 12/1983 |
| EP | 0 134 643 | 6/1984 |
| EP | 0134643 | 6/1984 |
| EP | 0 298 698 | 1/1989 |
| EP | 0298698 | 1/1989 |
| GB | 754869 | 8/1956 |
| GB | 754869 A | 8/1956 |
| GB | 757873 | 9/1956 |
| GB | 1 516 257 A | 6/1978 |
| GB | 1516257 | 6/1978 |
| GB | 1 566 363 | 4/1980 |
| GB | 1566363 | 4/1980 |
| GB | 2 158 102 A | 11/1985 |
| GB | 2158102 | 11/1985 |
| JP | 52-32988 | 3/1977 |
| JP | 52-078608 | 7/1977 |
| JP | 64-15334 | 1/1989 |
| JP | 64-15334 A | 1/1989 |
| JP | 4-107234 | 4/1992 |
| JP | 2001192711 | 7/2001 |
| RU | 2082561 | 6/1997 |
| UA | 38454 | 5/2001 |
| UA | 38454 A | 5/2001 |
| WO | 92/14851 A1 | 9/1992 |
| WO | WO 92/14851 | 9/1992 |
| WO | 2005/002766 A1 | 1/2005 |
| WO | WO 2005/002766 | 1/2005 |
| WO | WO 2007/109847 | 10/2007 |

OTHER PUBLICATIONS

Okabe, et al., "Reaction Pathways during Metallothermic Reduction of $TiCl_4$ by Utilizing Chemical Potential Diagrams," *Titanium Extracting and Processing*, 1997, pp. 133-150.
DeKock, et al., "Attempted Preparation of Ti-6-4 Alloy Powders from $TiCl_4$, Al, $VCl_4$ and Na," *Metallurgical Transactions B*, vol. 18B, Sep. 1987, pp. 511- 517.
Bartlett, et al., "Titanium Powder by Magnesium Reduction of TiCl in Liquid Zinc Alloy," *Light Metals*, 1994, pp. 1181-1186.
Lu, et al., "The Mechanical Alloying of Titanium Aluminides," *JOM*, Feb. 2002, pp. 62-64.
Bertolino, et al. "Ignition mechanism in combustion synthesis of Ti-Al and Ti-Ni systems," *Intermetallics* 11, 2003, pp. 41-49.
Gerdemann, et al. "Titanium Aluminide Powder Production Via Reaction Between $TiCl_4$ and Al," *Gamma Titanium Aluminides*, 1999, pp. 341-346.
Chen, et al. "Direct electrochemical reduction of titanium dioxide to titanium in molten calcium chloride," *Nature*, vol. 407, Sep. 2000, pp. 361-364.
Murphy, et al. "Equilibrium calculations of the reduction of titanium tetrachloride by aluminum and hydrogen," *High Temp. Chem Processes* 3, Aug. 1994, pp. 365-374.
Reddy, et al. "Thermodynamic properties of Ti-Al intermetallics," *Journal of Alloys and Compounds* 321, 2001, pp. 223-227.
T. Uda, et al; "Contactless Electrochemical Reduction of Titanium (II) Chloride by Aluminum", Metallurgical and Materials Transactions B, vol. 31B, Aug. 2000, pp. 713-721.
U.S. Appl. No. 12/225,552, filed Jan. 9, 2009.
U.S. Appl. No. 12/988,884, filed Dec. 22, 2010.
U.S. Appl. No. 13/514,990, filed Jun. 10, 2012.
Jan. 31, 2008, ESR Application No./Patent No. 04737520.9-1215.
May 21, 2007, ISR for PCT/AU2007/000385.
Feb. 8, 2008, IPER for PCT/AU2007/000385.
Jun. 19, 2009, ISR for PCT/AU2009/000501.
Jun. 23, 2011, ISR for PCT/AU2010/001697.
Mar. 25, 2010, Supplementary ESR for copending European Application EP 07718632, completed Mar. 25, 2010.
May 14, 2010, English Translation of Official Decision on Grant in corresponding Ukrainian Application No. 2008 12511, issued May 14, 2010.
1994, Bartlett et al., "Titanium Powder by Magnesium Reduction of TiCl in Liquid Zinc Alloy," Light Metals, 1994, pp. 1181-1186.
2003, Bertolino, et al. "Ignition mechanism in combustion synthesis of T-Al and Ti-Ni systems," Intermetallics 11, 2003, pp. 41-49.
Sep. 2000, Chen et al. "Direct electrochemical reduction of titanium dioxide to titanium in molten calcium chloride," Nature, vol. 407, Sep. 2000, pp. 361-364.
Sep. 1987, DeKock et al., "Attempted Preparation of Ti-6-4 Alloy Powders from $TiCl_4$, Al, $VCl_4$ and Na," Metallurgical Transactions B, vol. 18B, Sep. 1987, pp. 511-517.
1999, Gerdemann et al. "Titanium Aluminicide Powder Reduction Via Reaction Between $TiCl_4$ and Al," Gamma Titanium Aluminides, 1999, pp. 341-346.
2002, D. Hu; "Effect of boron addition on tensile ductility in lamellar TiAl alloys", Intermetallics 10 (2002) pp. 851-858.
Feb. 2002, Lu, et al. "The mechanical Alloying of Titanium Aluminides," JOM, Feb. 2002, pp. 62-64.
Aug. 3, 1994, Murphy et al. "Equilibrium Calculation of the Reduction of Titanium Tetrachloride by Aluminum and Hydrogen" High Temp. Chem. Processes 3, Aug. 1994, pp. 365-374.
1997, Okabe et al., "Reaction Pathways during Metallothermic Reduction of $TiCl_4$ by Utilizing Chemical Potential Diagrams," Titanium Extracting and Processing, 1997, pp. 133-150.
2001, Reddy, et al. "Thermodynamic properties of Ti-Al intermetallics," Journal of Alloys and Compounds 321, 2001, pp. 223-227.
Aug. 2000, T. Uda et al.; "Contactless Electrochemical Reduction of Titanium (II) Chloride by Aluminum", Metallurgical and Materials Transactions B, vol. 31B, Aug. 2000, pp. 713-721.
Dec. 15, 2005, U.S. Appl. No. 10/560,804 Jawad Haidar, published as US 2006/0191372, also cited herein.
Jul. 29, 2004, ISR PCT/AU2004/000899.
D. Hu; "Effect of boron addition on tensile ductility in lamellar TiAl alloys", Intermetallics 10 (2002) pp. 851-858.
European Search Report Application No./Patent No. 04737520.9-1215, Jan. 31, 2008.

* cited by examiner

METHOD AND APPARATUS FOR THE PRODUCTION OF METAL COMPOUNDS

CROSS REFERENCE TO RELATED APPLICATIONS

This application is a national stage entry of PCT/AU2004/000899, filed Jul. 5, 2004, which claims priority to Application No. AU 2003903426, filed Jul. 4, 2003 and this application claims priority to Application No. AU 2003906420, filed Nov. 21, 2003.

FIELD OF THE INVENTION

The present invention relates to a method and apparatus for the production of metal and metal compounds and, particularly, but not exclusively, to a method and apparatus for production of titanium-based alloys and intermetallic complexes, and more particularly, but not exclusively, to a method and apparatus for the production of titanium-aluminium based alloys and intermetallic complexes, and more particularly, but not exclusively, to a method and apparatus for the production of titanium-aluminium based alloys and intermetallic complexes in a powder form.

BACKGROUND OF THE INVENTION

Titanium-aluminium alloys and inter-metallic compounds (generically termed herein "titanium-aluminium compounds") are very valuable materials. However, they are difficult and expensive to prepare, particularly in the preferred powder form. This expense of preparation limits wide use of these materials, even though they have highly desirable properties for use in automotive, aerospace and other industries.

Titanium minerals are found in nature in the form of a very stable oxide ($TiO_2$). Common processes for the production of titanium are the Kroll process and the Hunter process. The Kroll process requires the use of magnesium as a reducing agent to reduce $TiCl_4$ (prepared from the oxide by a pre-process of chlorination) to produce the Ti metal. The Hunter process requires the use of sodium as the reducing agent. Because $TiCl_4$ is still thermodynamically stable, highly reactive reducing agents such as magnesium or sodium are required to produce titanium metal out of $TiCl_4$. Such highly reactive reducing agents are difficult and expensive to handle. As the magnesium chlorides in the case of the Kroll process are stable up to temperatures in excess of 1300K, the product is often in the form of a Ti sponge mixed with $MgCl_2$ and remnants of Mg and $TiCl_2$. To obtain pure Ti, the product requires extensive post-processing, including washing and melting in a vacuum arc furnace to remove all impurities. This contributes to the present high cost of the production of titanium.

In the known technologies for production of titanium alloys such as Ti—Al—V, and intermetallic compounds such as $Ti_3Al$, TiAl, $TiAl_3$, Ti—Al—(Cr, Nb, Mo, etc) and alloys based on these compounds, appropriate amounts of sponges, ingots or powders of the metals which comprise these alloys are milled or melted together and annealed, hence adding to the production cost, particularly as it is necessary to obtain the metals first which, as discussed, in the case of titanium, involves considerable expense. For production of a powder of these titanium alloys and intermetallic compounds, further processing is usually required, adding to the already high production cost.

Prior Al-based processes for manufacturing of Ti—Al compounds include starting from Al powder and Ti powder (references: (I. Lu, M. O. Lai and F. H. Froes, *Journal of Metals*, February 2002, p 62) and (N. Bertolino et al., *Intermetallics*, Vol 11, 2003, p 41) and reduction of $TiCl_4$ with AlCl (US patent application US2002/0184971 A1). For the first process, the starting materials are Al and Ti powders, the powders usually being mechanically milled to make a uniform mixture followed by heating in a furnace. The resulting materials are at best in the form of solid lumps and this process is usually unable to produce fine powder. Furthermore, the resulting compounds often require heat treatment to produce the required material properties. For the second process, Al metal is heated in the presence of chlorine at temperature around 1200C to produce gaseous AlCl that is then reacted with $TiCl_4$ in the gas phase to produce powders of titanium aluminides. Both these processes are quite complex and costly to operate.

It is also known to perform direct reduction of $TiCl_4$ with aluminium. However, this results in the production of an uncontrollable composition of compounds and production of a single phase material such as TiAl has not been achieved (see in particular S J Gerdemann & D E Alman, page 3341 in *Gamma Titanium Alumini* 1999, edited by Kim, Dimiduk & Loretto, The Minerals Metals and Materials Society USA).

Over the past several decades, there have been extensive attempts made to replace the existing Kroll and Hunter technologies using techniques such as electrowinning, plasma-hydrogen and also aluminothermic reduction.

The use of hydrogen plasma for the reduction of titanium chloride in a plasma atmosphere is difficult due to unfavourable thermodynamic characteristics, since chlorine preferably reacts with titanium in the reverse reaction to produce titanium chlorides, hence degrading the quality of the produced Ti powder and limiting the efficiency of the method. In a process disclosed in U.S. Pat. No. 5,935,293, a fast quench reactor was used to cool down the plasma in order to prevent recombination processes leading to formation of titanium chlorides. According to the description in U.S. Pat. No. 5,935,293, the process is highly energy expensive relative to the existing Kroll technology.

In another process (G. Z. Chen, D. J. Fray and T. W. Farthing, *Nature*, Vol 407, (2000), 361), Chen et al. made titanium sponge directly from the oxide by reduction in a molten calcium chloride salt. Oxygen from the titanium oxide recombines with carbon at an anode to form $CO_2$. However, the composition of the resulting sponge-like titanium product produced corresponds to the composition of the starting minerals. The process is still under development and is yet to be demonstrated on an industrial scale.

Attempts have been made to use aluminium as a reducing agent for $TiCl_4$ in plasma systems. For reduction of $TiCl_4$ using aluminium, the products are in the form of solid phase titanium-aluminium intermetallic compounds mixed with aluminium chloride and some residual titanium dichloride. A description of various attempts using aluminium together with a description of the thermodynamics of the process are given by Murphy and Bing (*High Temp. Chem. Processes*, Vol 3, 365-374, 1994). Because of difficulties associated with gas phase reactions it has not been possible to produce titanium and/or titanium-aluminium compounds by direct aluminothermic reduction of titanium chlorides.

SUMMARY OF THE INVENTION

In accordance with a first aspect, the present invention provides a method for the production of titanium compounds, comprising the steps of mixing aluminium with a precursor material including titanium subchloride, and heating the mixture, to form aluminium chlorides and titanium compounds.

When the term titanium subchloride is used, it can refer to titanium trichloride $TiCl_3$ and/or titanium dichloride $TiCl_2$ or other combinations of titanium and chloride excluding $TiCl_4$ which is referred to herein as titanium chloride.

When the term titanium compound is used, it can refer to titanium alloys and/or titanium/metal intermetallic compounds. In one preferred form which is referred to herein, the titanium compounds include titanium-aluminium alloys and/or titanium-aluminium intermetallic compounds.

In one embodiment the method can also comprise the step of arranging reaction conditions to favour a forward reaction to form the aluminium chlorides and titanium compounds. The step of arranging the reaction conditions can involve driving aluminium chlorides away from a reaction zone where the aluminium and precursor material are reacting. In one form, the step of arranging the reaction conditions can include a continuous removal of aluminium chlorides from the reaction zone.

The method can also comprise the step of preparing the titanium subchloride precursor material from titanium chloride ($TiCl_4$). In one embodiment, the step of preparing titanium subchloride is carried out by the reduction of $TiCl_4$ using aluminium. In an alternative embodiment, the step of preparing titanium subchloride is carried out by heating $TiCl_4$ in a plasma of an argon-hydrogen mixture. In one embodiment, $TiCl_3$ is prepared by the reduction of $TiCl_4$, although this reaction may also form titanium dichloride $TiCl_2$.

In either embodiment, the method can also comprise the further step of recycling at least some of the aluminium chloride formed, and utilising the aluminium chloride to produce $TiCl_4$. The aluminium chloride can be used to reduce titanium oxide to produce $TiCl_4$.

In any of the embodiments of the method mentioned, aluminium oxide can be produced by the reduction of titanium oxide and the aluminium oxide electrolysed to produce aluminium raw material for use in the steps of said method.

In one embodiment of the method, the aluminium chlorides are condensed away from the reaction zone at a temperature lower than that in the reaction zone. In one embodiment of the method, if titanium subchloride escapes the reaction zone it can be condensed at a temperature different to that in the reaction zone. Furthermore the condensed titanium subchloride can optionally be returned to the reaction zone.

In one form of the method, the precursor material can include vanadium subchloride, and a product of said method can be an alloy or intermetallic complex including titanium, aluminium and vanadium. This method can also include the steps of mixing the precursor material in appropriate proportions and carrying out the method to produce Ti-6Al-4V.

In a further form of the method, the precursor material can include zirconium subchloride, and a product of the method can be an alloy or intermetallic complex including titanium, aluminium, zirconium and vanadium.

In one form of the method, the precursor material can include niobium halide and chromium halide, and a product of said method can be an alloy or intermetallic complex including titanium, aluminium, niobium and chromium. This method can also include the steps of mixing the precursor materials in appropriate proportions and carrying out the method to produce Ti-48Al-2Nb-2Cr.

In further embodiments of the method, the precursor material can include a source of one or more elements selected from the group comprising chromium (Cr), niobium (Nb), vanadium (V), zirconium (Zr), silicon (Si), boron (B), molybdenum (Mo), tantalum (Ta) and carbon (C), and products of said method can include titanium-aluminium compounds which include one or more of these elements. The source of the element(s) can be a metal halide, a subhalide, a pure element or another compound which includes the element. The products can also include one or more of an intermetallic compound, a titanium-(selected element)-alloy, and intermediate compounds.

In still further embodiments, the precursor materials may include other metals and/or metal halides, and the products of said method may include titanium alloys or intermetallic compounds. For example the precursor material may include vanadium subchlorides, such as vanadium trichloride and/or vanadium dichloride, and the products may include one or more of a titanium-aluminium-vanadium alloy, an intermetallic compounds, and a combination of a titanium-vanadium alloy and an intermetallic compound. The precursor materials may also include a source of other precursors containing a required alloy additive, depending upon the required end product.

In one form of the method, the aluminium can be added in the form of a powder having an approximate upper grain size of less than about 50 micrometres. In an alternative form of the method, the aluminium can be in the form of a powder of an approximate upper grain size of greater than about 50 micrometres, and the method comprises the step of milling the aluminium powder and titanium subchloride to reduce the grain size of the aluminium powder in at least one dimension. In yet another alternative form of the method, the aluminium can be in the form of flakes having a thickness in one dimension of less than about 50 micrometres. Using a fine aluminium powder is preferred, although the relatively coarser aluminium powder or flakes is a cheaper raw material.

In any of the embodiments described, the method can also comprise the further step of adding a reagent to a product of the method to produce a further product.

In any of the embodiments described, the method can also include a pre-processing step of forming the titanium subchloride as precursor material.

The inventor has found that using a precursor material which includes titanium subchloride (preferably titanium trichloride) gives a number of advantages. There are not the problems of different, uncontrollable phases which are involved in starting from titanium tetrachloride as a precursor. The composition of the end product is relatively controllable and depends on the ratios of the starting materials. The correct ratios of starting materials are incorporated in the precursor materials to produce the appropriate proportions of components in the product.

The inventor believes that the new method enables a cheaper and more controllable process for the production of titanium-aluminium compounds. It is not necessary to convert the raw titanium minerals to titanium metal, as in some of the prior art processes discussed earlier. In one embodiment of the present process, titanium oxide can be chlorinated using conventional technology to give titanium tetrachloride. This can then be reduced using aluminium or hydrogen to give titanium subchlorides (mainly titanium trichloride), which can then be used as the precursor material for the formation of the titanium-aluminium compounds.

It is possible to form T-6Al-4V using this process, which is one of the major titanium alloys used. It is also possible to form T-48Al-2Nb-2Cr. It is also possible to form other alloys such as Ti—Al—Nb—C, and $Ti_3Al$ based alloys.

A process in accordance with embodiments of the present invention described has the advantage that alloy powder is produced directly, with no further physical processing.

In accordance with a second aspect, the present invention provides a method of producing titanium-aluminium compounds, comprising the steps of:
- heating a precursor material of $TiCl_4$ in a plasma of an argon-hydrogen mixture to produce $TiCl_3$;
- mixing aluminium with said $TiCl_3$; and
- heating the resultant mixture to produce titanium-aluminium compounds and $AlCl_3$.

In accordance with a third aspect, the present invention provides a method of producing titanium-aluminium compounds, comprising the steps of:
- heating a mixture of $TiCl_4$ and aluminium to form $TiCl_3$ and $AlCl_3$;
- heating the mixture to a reaction zone temperature above 300 C and providing for $AlCl_3$ to be evaporated from the reaction zone;
- adding further aluminium to the mixture; and
- heating the mixture to a temperature above 400C to form $AlCl_3$ and titanium-aluminium compounds.

In accordance with a fourth aspect, the present invention provides an apparatus for the production of a metal compound, comprising:
- a reaction vessel arranged in use for the mixing of aluminium with a precursor material of metal halide;
- the vessel also arranged in use for the resultant mixture to be heated to a temperature sufficient for the precursor material to react with the aluminium to form aluminium halide and a product; and
- a first condensation zone arranged in use to operate at a temperature such that the aluminium halide condenses in the first condensation zone.

In one form the apparatus can also comprise a second condensation zone arranged to condense metal halide escaping the reaction mixture. The second condensation zone can be arranged to return condensed metal halide to the reaction zone.

In one embodiment, the reaction zone operates at a temperature T1 and the first condensation zone at a temperature T2 which is lower than the temperature T1. In one form, the second condensation zone operates at a temperature T3 which is between T1 and T2.

In one example, the precursor material may be a material containing titanium as a component, such as titanium trichloride and/or titanium dichloride. Where the precursor material includes titanium trichloride and where the apparatus includes a first condensation zone that operates at temperature T2, T2 is preferably below 200C, wherein gaseous aluminium trichloride emanating from the reaction zone is condensed.

When the apparatus includes a second condensation zone, T3 is below 500C and titanium trichloride which escapes from the reaction zone is recondensed at the second condensation zone. In one embodiment, the second condensation zone is located between the reaction zone and the first condensation zone.

Typically the apparatus includes a heating arrangement for heating the precursor material. In some embodiments, openings are provided for the introduction of further gases. Openings may also be provided to evacuate the vessel to a low pressure. In still further embodiments, the reaction vessel may be a number of discrete vessels, each vessel providing a different reaction or condensation zone.

Preferably, the apparatus of this aspect of the invention is suitable for implementing the method of any of the foregoing or following aspects of the invention described herein.

In accordance with a fifth aspect, the present invention provides a method for the production of a metal compound, comprising the steps of:
- mixing aluminium with a precursor material of metal halide;
- heating the mixture to a temperature sufficient for the precursor material to react with the aluminium, resulting in the formation of aluminium halide; and
- arranging the conditions to favour a forward reaction to form the aluminium halide and to reduce a reverse reaction to form aluminium and precursor material.

In one form the step of arranging the reaction conditions can include the step of driving aluminium halide away from a reaction zone where the aluminium and precursor material are reacting. Continuous removal of aluminium halide facilitates the forward reaction.

In one embodiment the metal halide can be a titanium subhalide such as titanium trichloride, and a product of the reaction can include titanium compounds. In further embodiments of the method, the precursor material can include a source of one or more elements selected from the group comprising chromium (Cr), niobium (Nb), vanadium (V), zirconium (Zr), silicon (Si), boron (B), molybdenum (Mo), tantalum (Ta) and carbon (C).

In accordance with a sixth aspect, the present invention provides a method for the production of vanadium and/or vanadium compounds, comprising the steps of mixing aluminium with a precursor material including vanadium subhalide, and heating the mixture, to form aluminium halides and vanadium and/or vanadium compounds.

The vanadium compounds may include vanadium-aluminium alloys and/or vanadium aluminium intermetallic complexes.

In accordance with a seventh aspect, the present invention provides a method for the production of zirconium and/or zirconium compounds, comprising the steps of mixing aluminium with a precursor material including zirconium subhalide, and heating the mixture, to form aluminium halides and zirconium and/or zirconium compounds.

The zirconium compounds may include zirconium-aluminium alloys and/or zirconium-aluminium intermetallic complexes.

In accordance with an eighth aspect, the present invention provides a method for the production of titanium and/or titanium compounds, comprising the steps of mixing a reducing agent with a precursor material including titanium subhalide, and heating the mixture, to form halides of the reducing agents and titanium and/or titanium compounds. The reducing agent can be selected from the group comprising zinc, magnesium, sodium, aluminium or other like metals.

In accordance with a ninth aspect, the present invention provides a method for production of a powder of titanium-aluminium intermetallic compounds including at least one of $Ti_3Al$, $TiAl$ and $TiAl_3$, and alloys based on titanium-aluminium intermetallics according to the first aspect, wherein starting materials for the method include aluminium powder and at least one of titanium chloride or a titanium subchloride.

BRIEF DESCRIPTION OF THE DRAWINGS

Features and advantages of the present invention will become apparent from the following description of embodiments thereof, by way of example only, with reference to the accompanying drawings, in which.

DESCRIPTION OF PREFERRED EMBODIMENTS

Figure 1:
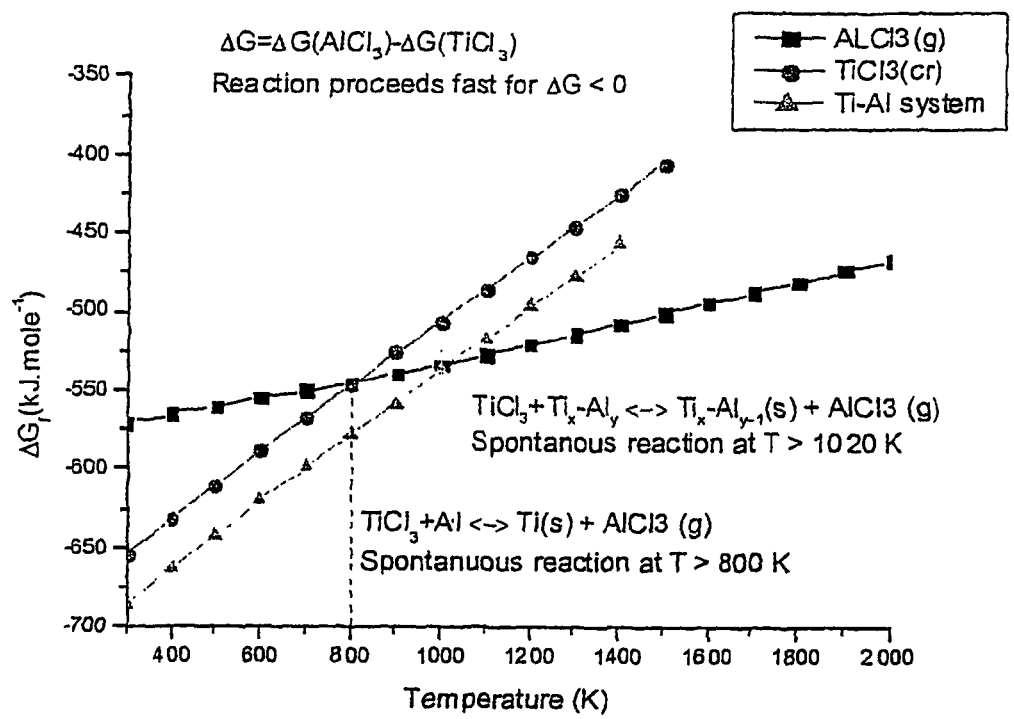
FIG. 1 shows the Gibbs energy of formation of $AlCl_{3(g)}$, $TiCl_3$ and $TiCl_3+Ti—Al$.

The following description is of preferred embodiments of processes for producing metal compounds, including fine powder and ingots with specific compositions. The processes are useful for production of forms of metals such as titanium, vanadium and zirconium together with alloys and intermetallic compounds of these metals with a controllable amount of aluminium.

For example, Ti—Al, Ti$_3$Al, TiAl$_3$, Ti—Al—Cr and Ti—V—Al can be made with accuracy by varying the aluminium content. The relative amounts of titanium chlorides and aluminium are determined by the required composition of end product. In one embodiment the process comprises the steps of preparing solid metal halides, mixing the halides with aluminium metal and heating the mixture to a temperature T1 to trigger reactions leading to formation of aluminium chloride at a temperature (T1) above the boiling temperature of aluminium chlorides, and condensing the aluminium chlorides away from the reaction zone at a temperature T2, where T2 is less than T1. The driving of the aluminium chloride away from the reaction zone moves the equilibrium of reaction in the forward direction i.e. to formation of aluminium chloride and metal (and other products depending upon reaction conditions and components).

For titanium compounds, titanium subchlorides, (preferably titanium trichloride TiCl$_3$) can be produced from a precursor material of TiCl$_4$. The TiCl$_3$ is mixed with aluminium and then heated to a temperature above 300C so that AlCl$_3$ is formed in the gas phase and the AlCl$_3$ is condensed away from the reaction zone at a temperature below 200C, leaving a powder of Ti in the reaction zone containing a percentage of aluminium, as required for the end product.

In one embodiment, the process comprises the steps of heating TiCl$_4$ in a plasma of an argon-hydrogen mixture to produce TiCl$_3$, and then mixing the resulting TiCl$_3$ powder with aluminium and then heating the mixture to trigger the reaction. The reaction vessel used is arranged to allow for aluminium chloride to be continuously removed and condensed in a region away from the reaction zone of the titanium chloride and aluminium mixture. The TiCl$_3$, and aluminium in a powder or a lump form (but preferably in a powder form) are mixed together under inert gas or in a vacuum. The mixture is then heated to a temperature of several hundred degrees to trigger reaction between the two compounds, leading to formation of AlCl$_{3(g)}$. The AlCl$_3$ is then condensed elsewhere in the vessel at a temperature below 200C.

In a further embodiment, the process comprises the steps of heating predetermined amounts of TiCl$_4$ and aluminium to form TiCl$_3$ and AlCl$_3$, heating the product mixture to a temperature above 300C and providing for AlCl$_3$ to be evaporated from the reaction zone. The AlCl$_3$ was driven away from the reaction and condensed away from the reaction zone at a temperature below 200 C. Further aluminium material was then added to the product in an amount depending on the required composition, and then the mixture was heated under the same physical conditions to a temperature above 300C to trigger chemical reactions leading to formation of AlCl$_{3(g)}$ whilst providing for the AlCl$_{3(g)}$ to be condensed elsewhere in the vessel at a temperature below 200C.

The overall reactions between titanium subchlorides TiCl$_3$ and Al occur in the following form:

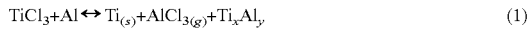  (1)

where Al is present in the solid or liquid phase.

The presence of Ti and Al may lead formation of Ti—Al intermetallic compounds such as TiAl$_{3(s)}$, TiAl$_{(s)}$ and Ti$_3$Al$_{(s)}$. Then TiCl$_3$ may react with aluminium according to the following simplified reactions:

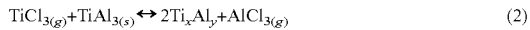  (2)

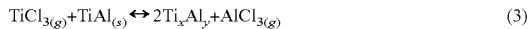  (3)

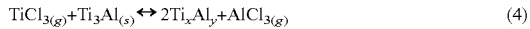  (4)

Figure 2:
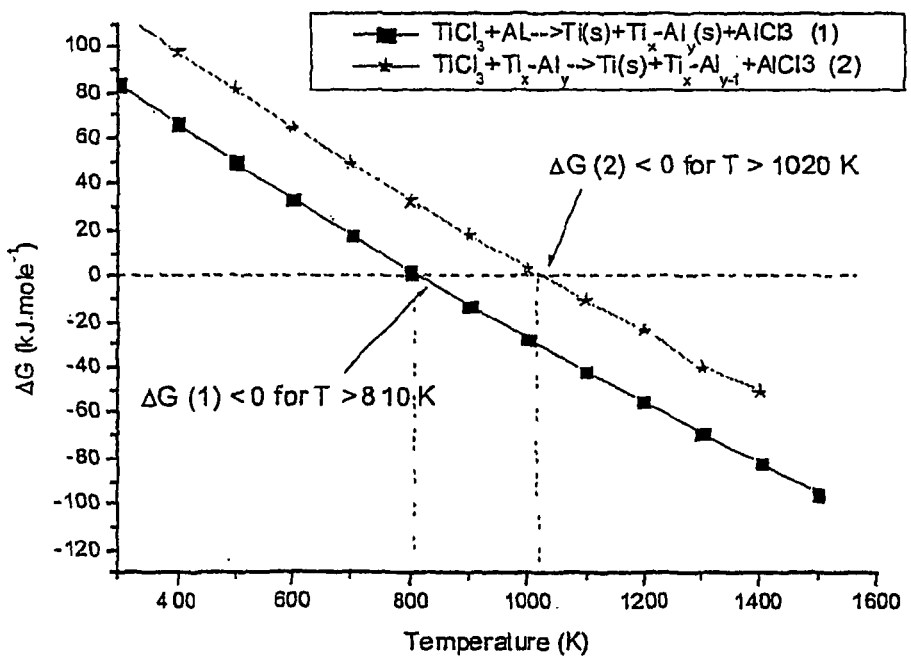
FIG. 2 shows the total Gibbs free energy for reactions leading to formation of Ti-metal based compounds.

Reactions 1-4 are driven in the forward direction by continuous removal of AlCl$_3$ from the reaction zone. As a result, equilibrium is moved to the right and the reaction proceeds until completion. The inventor has found that the reaction proceeds slowly at temperatures slightly above 200 C under an argon atmosphere at 1 atmosphere. The reaction becomes very rapid at temperatures above 500 C as the Gibbs free energy of the total reaction becomes negative as seen in FIGS. 1 and 2. FIG. 1 shows the Gibbs energy for AlCl$_3$, TiCl$_3$ and TiCl$_3$+Ti—Al. FIG. 2 shows the total Gibbs energy for Reactions 1-4 leading to formation of solid titanium.

Because of the strong affinity between titanium and aluminium, the presence of Al and Ti may result in formation of titanium-aluminium alloys and/or intermetallic compounds Ti$_x$Al$_y$. For these compounds, the Gibbs energy of formation $\Delta G_f$ is generally less than 32 kJ.mole$^{-1}$ for aluminium concentrations up to 80% of the alloys (R. G. Reddy et al. *J. Alloys and Compounds*, vol 321 (2001) 223).

FIG. 2 shows the variation with temperature of the total Gibbs energy for reactions leading to formation of AlCl$_{3(g)}$ and Ti$_{(s)}$, starting from TiCl$_3$ and Al. Also shown in FIG. 2 is the total Gibbs energy for reaction leading to formation of Ti$_{(s)}$ and AlCl$_{3(g)}$, starting from TiCl$_3$ and Ti—Al compounds. The total Gibbs free energy for Ti—Al is taken to be −32 kJ.mole$^{-1}$.

It is usually considered that chemical reactions proceed rapidly for negative values of the total Gibbs energy of the reaction. It is seen in FIG. 2 that ΔG is negative at temperatures above 800 K (525 C) for Reaction 1. This is in excellent agreement with the experimental observations which show rapid reaction between TiCl$_3$ and Al at a temperature of 500 C in an argon atmosphere at 1 atmosphere pressure. The inventor found that as the temperature of the mixture TiCl$_3$—Al increased above 300C, a cloud of white fume moved from the reaction zone towards the cold region of the vessel where it recondensed to form solid AlCl₃. At temperatures above 500C, the reaction became almost spontaneous, which is in agreement with the results shown in FIG. 2. For reactions involving Ti—Al compounds, the inventor found that in argon at 1 atmosphere pressure, reactions leading to formation of Ti$_{(s)}$ and Ti$_x$Al$_y$ (Reactions 2, 3 and 4) seem to proceed rapidly at temperatures above 850C.

Titanium chlorides may escape from the reaction zone, or disproportionate during heating. Gaseous TiCl₃ that may evaporate during the heating process reacts more readily with Al and further enhances formation of Ti compounds. For a mixture of TiCl₃ and Al powder, with the ratio of [Al]/[TiCl₃] >1, the inventor found that only small quantities of less than a few percent of TiCl₃ escape the reaction zone, and are recondensed in a region of the vessel at a temperature around 500 K and introduced back into the reaction zone, or alternatively collected for reprocessing. Any TiCl₂ that is produced due to disproportionation, reacts with Al compounds faster than TiCl₃ and enhances reactions, leading to formation of Ti compounds. The inventor found no evidence of major losses due to escape of TiCl₄. The inventor has made experimental observations which suggest that, for production of titanium with a high aluminium content, disproportionation reactions have little or no significant impact on the efficiency of the process, since most of the Ti in the feedstock materials was able to be accounted for. For production of titanium with a low aluminium content, the initial amount of aluminium used is less than the stoichiometric amount needed to remove all of the chlorine from the TiCl₃ materials. Excess titanium chloride remaining after depletion of available aluminium, is evaporated from the product and condensed elsewhere for reprocessing.

Figure 3:
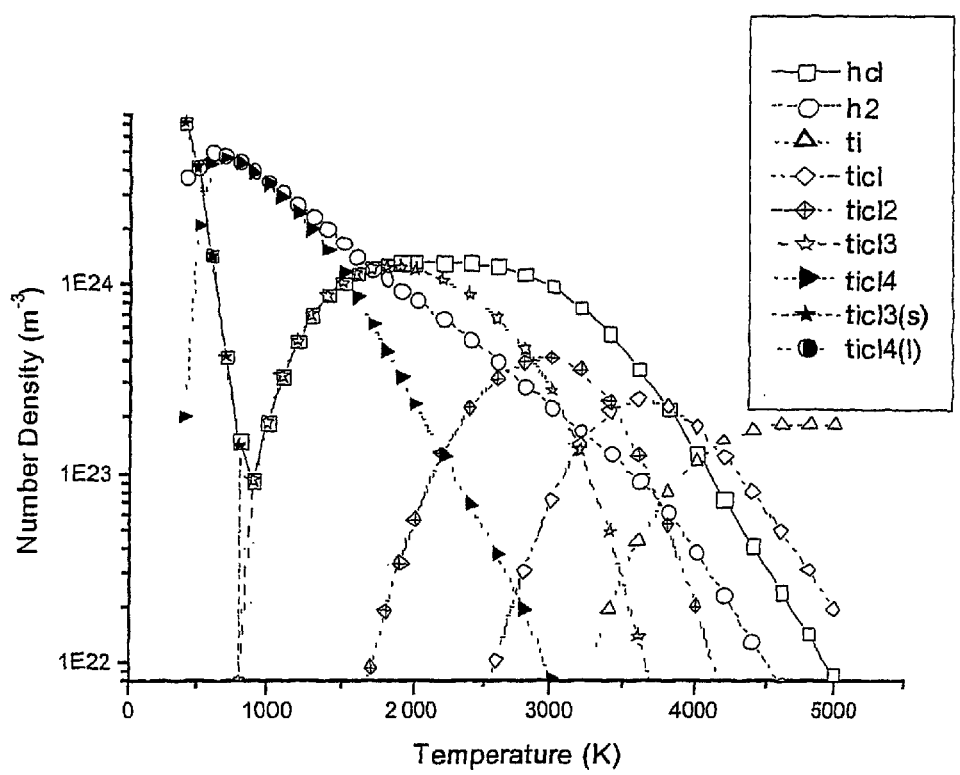
FIG. 3 illustrates the equilibrium composition of TiCl$_4$—Hydrogen plasma at temperatures of between 300K and 5000K.

Production of TiCl₃ can be carried out from TiCl₄ using a hydrogen plasma route or through reduction with aluminium. Production of TiCl₃ in a hydrogen plasma, known as the Huel process, has been used in industry for several decades. FIG. 3 shows the composition of TiCl₄-Hydrogen plasma at temperature between 300K and 5000K. It is seen that TiCl₄ can be converted into solid TiCl₃ by reacting it with hydrogen in a plasma. It is also seen that the conversion rate is almost 100%. The energy cost for synthesis of solid TiCl₃ is very low as the overall reaction leading to TiCl₃:

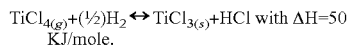

TiCl$_{4(g)}$+(½)H₂ ↔ TiCl$_{3(s)}$+HCl with ΔH=50 KJ/mole.

For reduction of TiCl₄ with aluminium, the process is usually carried out in closed vessel containing appropriate amounts of TiCl₄ and Al at a temperature above 200 C, leading to formation of a mixture of TiCl₃ and AlCl₃. Pure TiCl₃ is obtained from the mixture by distillation at temperature above 200C and allowing AlCl₃ to condense elsewhere.

For the process disclosed herein, production of titanium-aluminium compounds is made by mixing titanium subchlorides, preferably TiCl₃, with aluminium in a powder form, placing the materials in a vessel under vacuum or in an inert atmosphere, and heating the mixture. For processing under flowing inert gas or under vacuum, AlCl₃ formed due to reactions described above is driven into a different part of the vessel at a temperature below 200C. This favours the forward reaction formation of the aluminium halide. The heating continues until the reactions proceed to completion, or until complete depletion of available titanium subchlorides and/or aluminium occurs.

Figure 4:
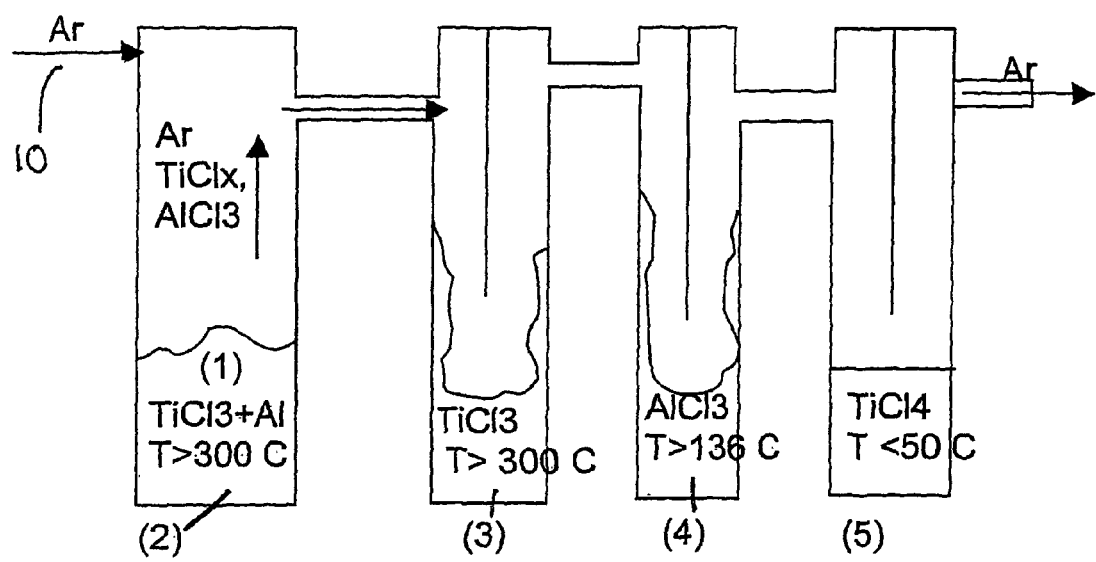
FIG. 4 is a schematic diagram of an apparatus for implementing a process in accordance with an embodiment of the present invention.

FIG. 4 shows a simple system used to make Ti—Al compounds with different Al contents and compositions. For this configuration, a mixture of TiCl₃ and Al, (1), is placed into a vessel (2) and heated to a temperature higher than 300 C (typically up to a temperature of the order of 1000 C depending on the composition of the mixture). Reactions between TiCl₃ and Al in the vessel (2) lead to formation of gaseous AlCl₃. A stream of argon gas (10) that is introduced in the vessel (2) carries the gaseous AlCl₃ together with any titanium chlorides that may escape from the reaction zone and drives them through a second vessel (3) which is held at a temperature between 300C and 500C, so that TiCl₃ is recondensed while AlCl₃ remains in the gas phase. Alternatively, TiCl₃ may be recondensed on the upper walls of the vessel (2) if it is held at an appropriate temperature. The remaining AlCl₃ together with any TiCl₄ that may have formed in the reaction zone due to disproportionation is driven through a vessel (4) at a temperature higher than 136C and lower than 200 C so that AlCl₃ is recondensed, and the remaining TiCl₄ is driven into a vessel (5) which is held at room temperature. The remaining argon gas is discharged out of the system or recycled.

Typically the gaseous atmosphere in the vessel is an inert gas, such as argon, helium, neon, xenon. Reactive gases such as methane or oxygen are undesirable as they can chemically react with the mixture resulting in other products. It is noted that the reactions can also be conducted in the absence of a gaseous atmosphere (eg under vacuum).

The TiCl₃ and an aluminium powder, the relative mass of which compared to the mass of TiCl₃ depends on the composition of the required product, are introduced into a vessel as described above and then heated until the reaction is complete.

For these processes described above, the product is typically in the form of a fine powder. The powder may be discharged from the vessel, at the completion of chemical reactions in the reaction zone, for further processing. Alternatively, the powder may be further processed in-situ for production of other materials. Alternatively the powder may be heated in-situ to make coarse grain powder. In a further embodiment, the powder may be compacted and/or heated in-situ and then melted to produce ingot.

It is highly advantageous to have titanium-aluminium compounds produced in powder form. As discussed in the preamble this is something that prior art processes cannot do directly. The powder form is much more versatile in manufacture of titanium aluminium alloy products, eg shaped fan blades that may be used in the aerospace industry.

The aluminium to be mixed with the titanium subchloride in these processes is, in one embodiment, in fine powder form, usually having an approximate grain topsize of less than 50 micrometres in diameter. Fine aluminium powder is usually less than 50 micrometres in diameter. A problem with using fine aluminium powder is that it is quite expensive to produce and therefore increases the cost of the process, although the inventor still believes that the cost will still be far less than prior art processes.

In an alternative embodiment, coarse aluminium powder is used, the powder having an approximate grain topsize of greater than 50 micrometres in diameter. The coarse aluminium powder is added to the titanium subchloride and the mixture is mechanically milled to reduce the dimensions of the aluminium powder in at least one dimension. This can result in the production of "flakes" of aluminium which have a size in at least one dimension which is less than 50 micrometres and which is sufficient to facilitate a satisfactory reaction between the titanium subchlorides and the aluminium. Flakes provide a higher reaction surface area and the small thickness of the flakes results in a more uniform composition of product.

In a further alternative embodiment, the aluminium raw material may be obtained in the form of flakes (ie already pre-milled) and mixed with the titanium subchlorides before reaction commences.

Figure 5:
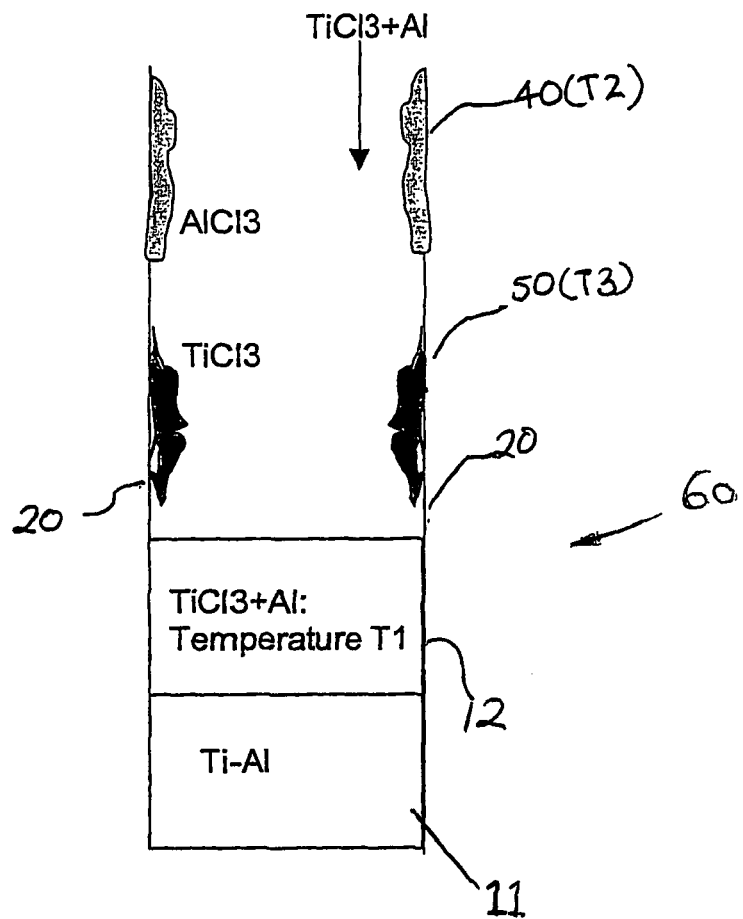
FIG. 5 is a schematic diagram of a further embodiment of an apparatus for implementing a process in accordance with an embodiment of the present invention.

A further embodiment of an apparatus which can be used to prepare titanium-aluminium compounds in accordance with the present invention is illustrated in FIG. 5. The apparatus in this case is a simple vessel (60) having relatively long (tall) side walls (20). An upper portion (40) of the side walls (20) forms a first condensation zone at temperature T2, for condensation of $AlCl_3$. A middle portion (50) of the side walls (20) forms a second condensation zone at temperature T3 allowing for condensation of $TiCl_3$. Titanium-aluminium compounds (11) are formed at the bottom of the vessel (60).

Parameters influencing reactions in the reaction zone include the pressure in the reaction vessel, the temperature of the reaction zone and the grain size of the Al powder. The inventor has found that, for operation under low pressure, a lower temperature is required in order to drive the reaction, as $AlCl_3$ is removed faster from the reaction zone and $TiCl_3$ species become more volatile and more active, thus triggering reactions with aluminium. However, this also results in a lower yield, escape of some volatile titanium chloride, and possibly to the production of a two phase product due to disproportionation.

Also, the inventor found that the reaction between $TiCl_3$ and Al depends strongly on the size of the Al powder grains. The reaction is much faster for smaller grains and also the yield is higher. Very fine aluminium powder results in the formation of a product of Ti—Al compounds with very fine grains, having irregular shapes. The inventor also found that with cheaper, less fine powders, the production yield of titanium aluminium compounds was still satisfactorily high and the resultant grain size comparable to that achieved with finer aluminium powders.

As discussed above, relatively coarse titanium powders can also be used, and the mixture can be milled to produce flakes, or the aluminium starting material can be provided in the form of flakes.

As discussed above, $TiCl_4$ can be used to produce the titanium subchlorides to be used as the precursor material for the production of the titanium aluminium compounds. Thus, titanium tetrachloride can be used as a feedstock material. The production of $TiCl_4$ from titanium ore (titanium oxide) is a well known process, usually as a precursor step for preparation of Ti metal by processes such as the Kroll and Hunter process. Methods in accordance with the present invention can also use $TiCl_4$ as a feedstock material. Instead of preparing the metal directly from $TiCl_4$, however, $TiCl_4$ is reduced to produce the precursor material $TiCl_3$. As briefly described above, this embodiment utilises two methods for the production of $TiCl_3$:

Reduction of $TiCl_4$ Using Aluminium:

$TiCl_4$ and aluminium metal (coarse or fine powder) in appropriate amounts are introduced into a closed vessel under an inert gas atmosphere (such as argon). The vessel is then heated to a temperature above 200C to form a mixture of $TiCl_3$ and $AlCl_3$. The $TiCl_3$ powder is then extracted from the mixture by distillation as described before. The $TiCl_3$ powder is then mixed with more aluminium if required and processed utilising an apparatus such as described above in relation to FIG. 4.

Reduction of $TiCl_4$ Using Hydrogen:

$TiCl_4$ may be fed into a plasma-processing unit operating with argon and hydrogen gas to produce $TiCl_3$. Products exiting from the plasma processing system may travel through a filter to separate $TiCl_3$ from the gas stream and the resulting $TiCl_3$ powder can then be moved into a processing chamber where it is mixed with an appropriate amount of aluminium, depending on the required composition of the end product. The mixture is then processed utilising an apparatus such as that described earlier in relation to FIG. 4 or FIG. 5. At the completion of the reaction, the materials can be discharged from the reaction vessel for use in manufacturing. Alternatively, the powder can be consolidated in-situ and then melted to produce ingots. Gases from the plasma system may be re-used after separation and cleaning.

In the above-described processes, it is possible to include other precursor materials in addition to the aluminium and titanium subchlorides, to obtain products of desired composition. For example, the precursor materials may include vanadium subchlorides, such as vanadium trichloride and/or vanadium dichloride and the products may include titanium-aluminium-vanadium compounds. The precursor material may include chromium halides and the products may include titanium-aluminium-chromium compounds. Niobium halide may be added as a starter material to produce titanium-aluminium-niobium-chromium compounds. The precursor materials may also include one or more halides of elements such as chromium, niobium, vanadium, zirconium, silicon, boron, molybdenum and carbon.

Figure 6:
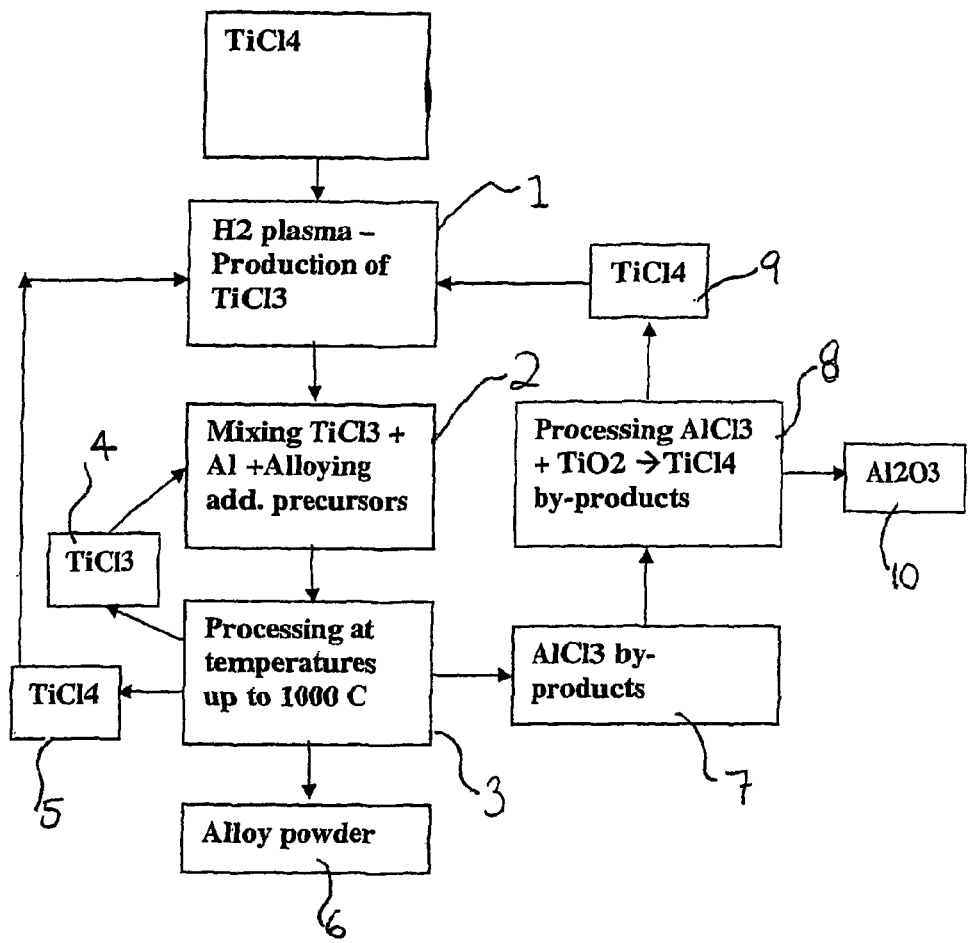
FIG. 6 is a schematic diagram illustrating a process for production of titanium based compounds in accordance with an embodiment of the present invention.

FIG. 6 is a schematic diagram of a process for the production of titanium-aluminium compound powder from titanium tetrachloride starting materials, in accordance with an embodiment of the present invention. The process discloses how aluminium trichloride can be recycled to produce raw materials.

$TiCl_4$ is reduced using hydrogen, as discussed above, to result in $TiCl_3$ (Step 1). $TiCl_3$ is then mixed with aluminium powder and any other precursors that are required are added (Step 2) and then the mixture is processed at temperatures of up to 1000C (temperature will depend upon the precursor mix and products required). Any titanium trichloride given off is put back into the reaction mixture (Step 4) and any titanium tetrachloride which is given off is fed back into the process (Step 5) for the production of titanium trichloride (Step 1). From the processing of Step 3, alloy powder products are also obtained (Step 6).

Any aluminium trichloride produced as a by-product (Step 7) can be used for other purposes. For example, such by-products can be electrolysed to produce aluminium and chlorine (the aluminium may be fed back into Step 2). Advantageously, in accordance with an embodiment of the present invention, the aluminium trichloride can be recycled to produce titanium tetrachloride by reacting the $AlCl_3$ with the titanium ore (rutile or titanium oxide, Step 8; producing titanium tetrachlorides, Step 9; and aluminium oxide, Step 10). The aluminium oxide produced by this process can be sold or electrolysed to produce aluminium raw material, which can be added to the precursor material in this process.

Figure 7:
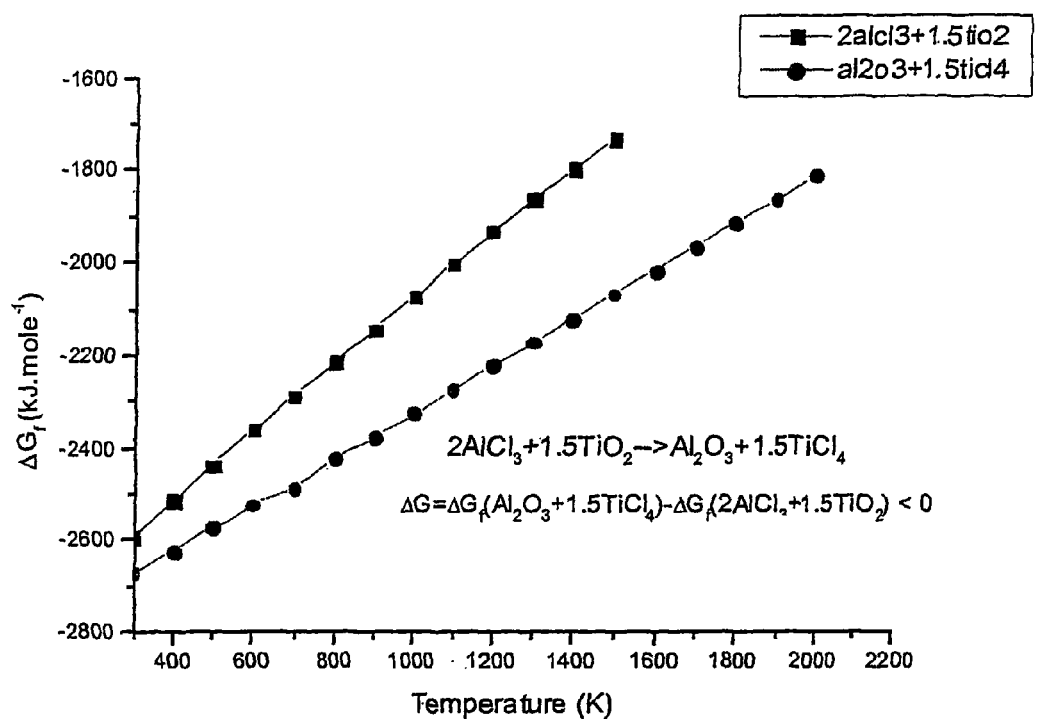
FIG. 7 illustrates the Gibbs free energy for half reactions leading to the formation of titanium-tetrachloride.

FIG. 7 shows the Gibbs free energy for the half reaction leading to aluminium oxide and titanium tetrachloride. The total Gibbs free energy for reaction leading to the formation of titanium tetrachloride is negative at all temperatures higher than 300 K, suggesting the reaction is exothermic.

Figure 8:
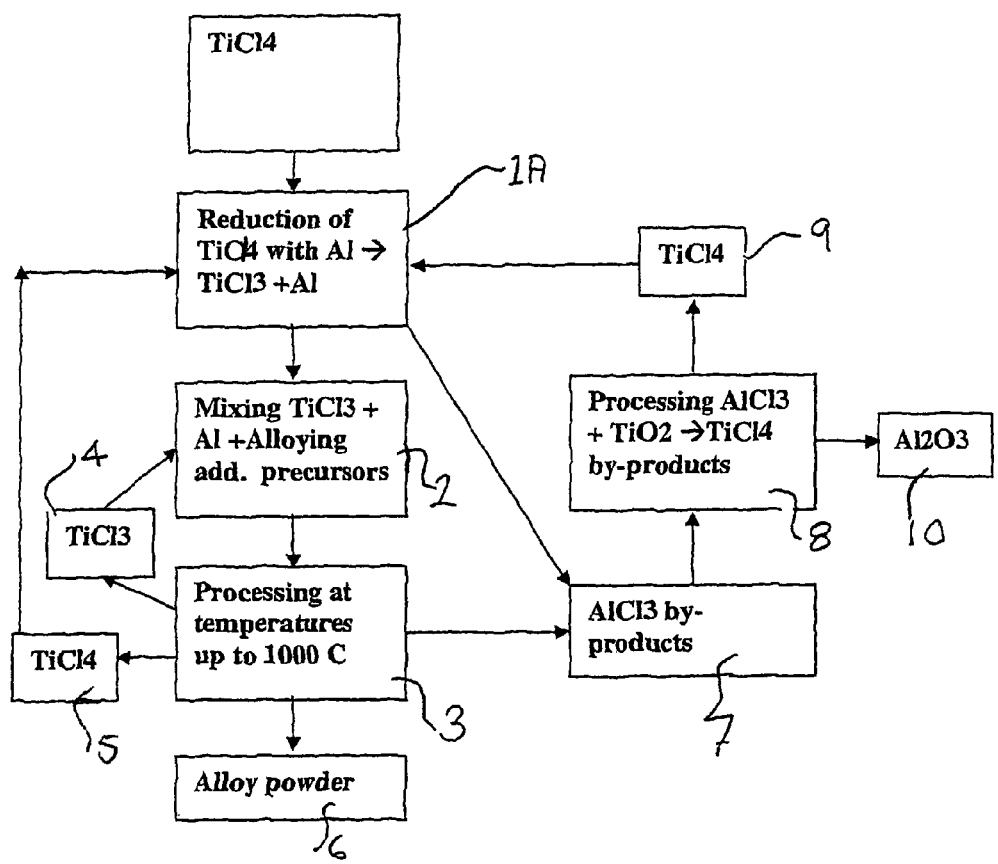
FIG. 8 is a schematic diagram illustrating a process for production of titanium based compounds in accordance with a further embodiment of the invention.

FIG. 8 is a schematic diagram of a further production process for the production of titanium aluminium compound powder which involves the step of reduction of titanium tetrachloride with aluminium in order to obtain the required titanium trichloride precursor material. All the other process steps in the FIG. 8 production process are the same as the process illustrated in FIG. 6 with the exception of Step 1A which is the reduction of titanium tetrachloride by aluminium. Note that Step 1A also may produce some aluminium trichloride by-products which can be recycled via Step 7.

The following are examples of preparation of titanium aluminium compounds in accordance with an embodiment of the present invention.

Example 1

Figure 9:
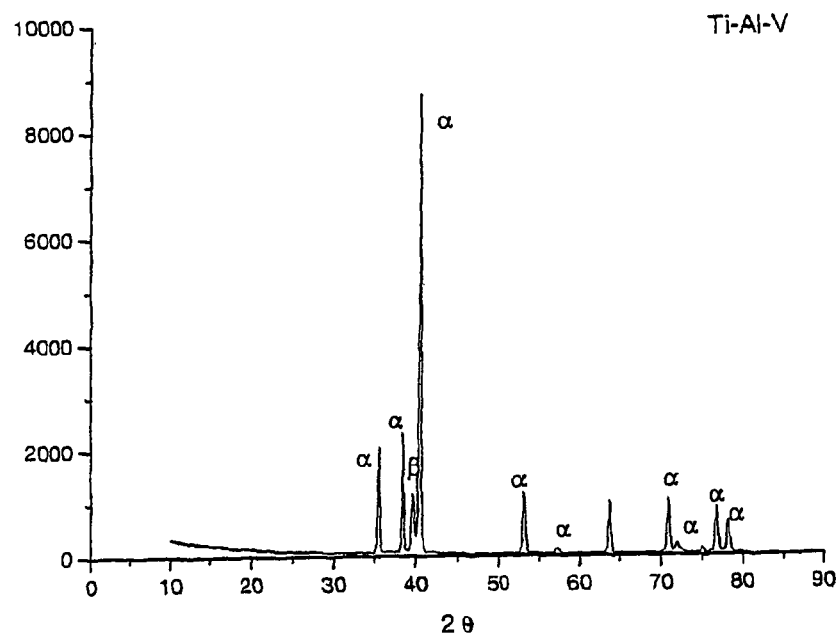
FIG. 9 is an XRD spectrum for a T-6Al-4V powder produced by an embodiment of the present invention.

T-6Al-4V $TiCl_3$ is prepared by reducing $TiCl_4$ with Al powder. The starting materials were 10 g of $TiCl_3$+1 g of Al powder (grain size<15 micrometres)+300 mg of $VCl_3$. The materials were mixed together very thoroughly and then introduced into a Ta crucible and heated in a quartz tube under flowing argon (100 cc/minute). The temperature is taken to 1000C over 30 minutes and kept there for 1 hour. Materials left in the crucible are 1.65 g of metallic powder. The powder is washed in distilled water to remove any residual chlorine (at ppm level) and then dried under argon. XRD analysis of the powder (FIG. 9) shows peaks that can be indexed on the T-6Al-4V composition. EDX analysis of the powder shows a weight % composition of Ti: 90.1%; Al: 5.8%; V: 4.1%. It was noted that the chlorine and oxygen level were either non existent or below the detection limits of the instrument.

Example 2

Figure 10:
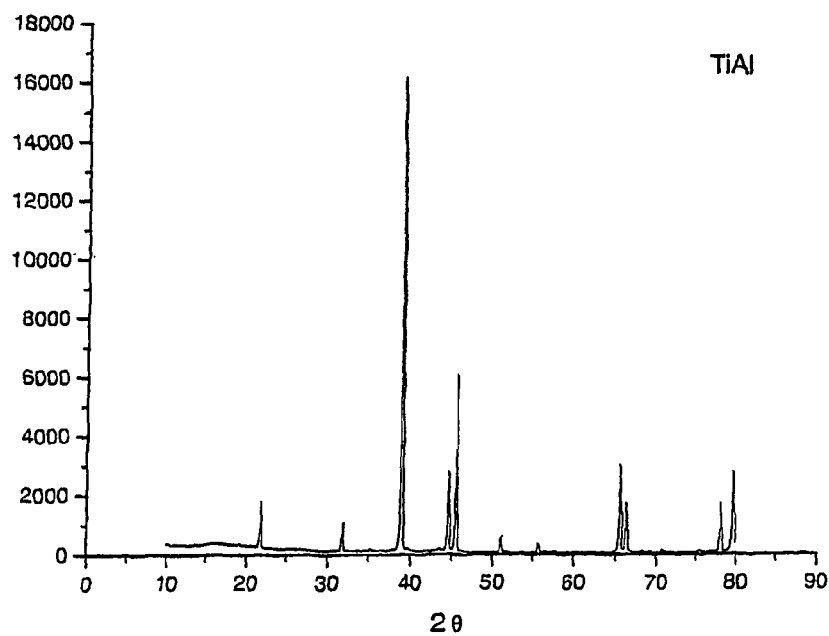
FIG. 10 is an XRD spectrum for a Gamma TiAl compound produced by an embodiment of the present invention.

Gamma Titanium Aluminides 10 g of $TiCl_3$ was mixed with 3.5 g of Al powder (grain size<15 micrometres). The mixture was introduced into a Ta crucible and heated in a quartz tube under flowing argon (100 cc/minute). The temperature is taken to 1000 C over 30 minutes and kept there for 1 hour. The crucible is then left to cool down and opened. Materials left in the crucible consisted of 4.72 g of grey metallic powder. The powder was washed in distilled water and then dried under argon. XRD analysis (FIG. 10) is consistent with the gamma TiAl composition. EDX analysis of the powder suggests the composition of 49.4% (atomic)Ti and 50.6% (atomic)Al.

Example 3

T-48Al-2Cr-2Nb 10 g of $TiCl_3$, 3.52 g of Al powder, 0.34 g of $CrCl_2$ and 0.78 g of $NbCl_5$ were mixed thoroughly and then placed in a Ta crucible in a quartz tube and then heated under flowing argon (100 cc/minute). The temperature was taken to 1000 C over a period of 30 minutes and then left at 1000 C for 1 hour. 4.4 g of metallic powder were left in the crucible. An EDX analysis of the powder suggests a composition of T-47Al-2.3Cr-2.3Nb (atomic percent).

The methods described herein may also be used for production of metals and metal alloys by mixing metal halide or a mixture of metal halides (chlorides, bromides, iodides and fluorides) and carrying out the process as described above for the $TiCl_4$. For example, zirconium and zirconium alloys may be produced using the same procedures described above for Ti and Ti-alloys respectively. For zirconium-based products, the starting material is zirconium chloride. Other examples of metals that can be produced using the present process include vanadium and its alloys and intermetallic compounds. Titanium metal can be produced by the above process following extensive recycling of titanium chlorides. Titanium intermetallic compounds which can be produced include $Ti_3Al$, TiAl and $TiAl_3$. In still further embodiments, reducing agents other than aluminium which may be able to be used with a metal subhalide to produce a metal compound can include zinc, magnesium, sodium, aluminium or other like metals.

The present method may be used for production of powders with a controlled particle size of various compositions including compounds of pure metal, oxides, nitrides of elements such as vanadium and zirconium, as described above for titanium.

Modifications and variations as would be apparent to a skilled addressee are deemed to be within the scope of the present invention.

The invention claimed is:

1. A method of producing titanium-aluminum compounds, comprising:
   a) reducing $TiCl_4$ with hydrogen or aluminum, controlled to favor production of titanium subchloride(s),
   b) collecting the titanium subchloride(s) formed in step a) for use as a precursor material,
   c) reacting titanium subchloride(s) collected in step b) with aluminum in a reaction zone at a temperature above 300° C. to form a titanium-aluminum compound and $AlCl_3$.

2. The method of claim 1, wherein step c) is promoted by removing $AlCl_3$ from the reaction zone.

3. The method of claim 2, wherein removal of $AlCl_3$ from the reaction zone is continuous.

4. The method of claim 1, wherein step a) is conducted at a temperature above the boiling point of $AlCl_3$.

5. The method of claim 1, wherein step a) is conducted at a temperature above 200° C.

6. The method of claim 1, wherein the reducing agent is aluminum and step a) is conducted with an excess of aluminum to $TiCl_4$.

7. The method of claim 1, wherein step c) is conducted at a temperature in the range of 300° C. to 1,000° C.

8. The method of claim 1, further comprising recycling at least some aluminium trichloride to produce $TiCl_4$.

9. The method of claim 8, wherein the aluminium trichloride is used to reduce titanium oxide to produce $TiCl_4$.

10. The method of claim 9, wherein aluminium oxide is produced by reduction of titanium oxide, and the aluminium oxide is electrolysed to produce aluminium for use in making titanium-aluminum compounds.

11. The method of claim 1, wherein the aluminium trichloride is condensed away from the reaction zone at a temperature lower than that in the reaction zone.

12. The method of claim 1, wherein titanium subchloride which escapes the reaction zone is condensed at a temperature different to that in the reaction zone.

13. The method of claim 12, further comprising returning the condensed titanium subchloride to the reaction zone.

14. The method of claim 1, further comprising introducing, a source of one or more elements selected from the group consisting of chromium, niobium, vanadium, zirconium, silicon, boron, molybdenum, and carbon.

15. The method of claim 14, wherein the source of the element(s) is a metal halide, a subhalide, a pure element.

16. The method of claim 14, wherein the products may include an intermetallic compound, a titanium-(selected element)-alloy, and intermediate compounds.

17. The method of claim 14, wherein the source includes vanadium subchloride, and a product of said method is an alloy or intermetallic complex including titanium, aluminium and vanadium.

18. The method of claim 17, further comprising adding the vanadium source to produce Ti-6Al-4V.

19. The method of claim 14, wherein the source includes zirconium subchloride, and a product of the method is an alloy or intermetallic complex including titanium, aluminium, zirconium and vanadium.

20. The method of claim 14, wherein the source includes niobium halide and chromium halide, and a product of said method is an alloy or intermetallic complex including titanium, aluminium, niobium and chromium.

21. The method of claim 20, further comprising adding the niobium source to produce Ti-48Al-2Nb-2Cr.

22. The method of claim 1, wherein the aluminium is added as a powder having an approximate upper grain size of less than about 50 micrometers.

23. The method of claim 1, wherein the aluminium is a powder having an approximate upper grain size of greater than about 50 micrometers, and the method comprises milling aluminium powder and titanium subchloride to reduce the grain size of said aluminium powder in at least one dimension.

24. The method of claim 1, wherein the aluminium is in the form of flakes having a thickness in one dimension of less than about 50 micrometers.

25. The method of claim 1, which is conducted in an inert gas atmosphere or in a vacuum.

26. The method of claim 1, wherein starting materials include aluminium powder and titanium chloride, and the method produces a powder of titanium-aluminium intermetallic compounds including at least one of $Ti_3Al$, TiAl and $TiAl_3$.

27. The method of claim 1, comprising adding a reagent to a product of the method to produce a further product.

* * * * *